(12) United States Patent
Evers et al.

(10) Patent No.: US 11,312,015 B2
(45) Date of Patent: Apr. 26, 2022

(54) SYSTEM AND METHOD FOR CONTROLLING THE CONTACT PRESSURE APPLIED BY AN ARTICULATED ROBOTIC ARM TO A WORKING SURFACE

(71) Applicant: Reliabotics LLC, New Brunswick, NJ (US)

(72) Inventors: Steven Evers, New Brunswick, NJ (US); Frank Thissen, New Brunswick, NJ (US); Chris Robinson, New Brunswick, NJ (US)

(73) Assignee: Reliabotics LLC, New Brunswick, NJ (US)

( * ) Notice: Subject to any disclaimer, the term of this patent is extended or adjusted under 35 U.S.C. 154(b) by 331 days.

(21) Appl. No.: 16/564,615

(22) Filed: Sep. 9, 2019

(65) Prior Publication Data

US 2020/0078940 A1    Mar. 12, 2020

Related U.S. Application Data

(60) Provisional application No. 62/729,391, filed on Sep. 10, 2018.

(51) Int. Cl.
*B25J 9/16*  (2006.01)
*B25J 13/08*  (2006.01)

(52) U.S. Cl.
CPC .......... *B25J 9/1633* (2013.01); *B25J 13/085* (2013.01)

(58) Field of Classification Search
CPC ...... B25J 9/1633; B25J 13/085; B25J 9/0009; B25J 11/0065; G05B 2219/39523; G05B 2219/40074; G05B 2219/37399; G05B 19/0426

USPC ......................................... 700/258, 245–264
See application file for complete search history.

(56) References Cited

U.S. PATENT DOCUMENTS

| | | | |
|---|---|---|---|
| 4,485,453 A * | 11/1984 | Taylor | B25J 9/026 318/568.1 |
| 4,694,230 A * | 9/1987 | Slocum | G05B 19/42 318/568.17 |
| 4,894,597 A | 1/1990 | Ohtomi | |
| 5,129,044 A * | 7/1992 | Kashiwagi | B25J 9/1633 700/251 |
| 5,495,410 A | 2/1996 | Graf | |
| 5,509,191 A * | 4/1996 | Best | B23P 21/004 29/722 |
| 5,548,194 A | 8/1996 | Hamura et al. | |

(Continued)

*Primary Examiner* — Jaime Figueroa
(74) *Attorney, Agent, or Firm* — LaMorte & Associates PC

(57) ABSTRACT

A system and method for moving an object against a working surface of a finishing machine that is set in a fixed position. The object is moved in a precise movement pattern while following a precise contact pressure pattern. The object is moved against the working surface of the finishing machine using a robot with an articulating arm. Other movement is provided by a dynamic platform upon which the robot rests. The dynamic platform includes a linear slide that enables the robot to reciprocally move. The dynamic platform also includes an active contact flange that acts upon the linear slide. The active contact flange is programmable and imparts the contact pressure pattern to the object through the linear slide and the robot. A rotary table can also be provided that selectively rotates the robot, the linear slide and the active contact flange.

18 Claims, 4 Drawing Sheets

(56) References Cited

U.S. PATENT DOCUMENTS

| | | | |
|---|---|---|---|
| 5,590,244 A * | 12/1996 | Nakata | B25J 9/1684 318/578 |
| 7,534,077 B2 | 5/2009 | Ban et al. | |
| 9,802,286 B2 * | 10/2017 | Nishi | G05B 19/41825 |
| 2003/0120377 A1 | 6/2003 | Hooke et al. | |
| 2004/0237331 A1 * | 12/2004 | Sarfaty | G02B 6/25 34/218 |
| 2006/0105678 A1 * | 5/2006 | Kohama | B24B 57/02 451/5 |
| 2006/0276934 A1 * | 12/2006 | Nihei | B25J 9/1679 700/245 |
| 2008/0308533 A1 * | 12/2008 | Takahashi | B23K 11/253 219/117.1 |
| 2009/0142990 A1 * | 6/2009 | Kohama | B24B 37/04 451/6 |
| 2009/0259412 A1 * | 10/2009 | Brogardh | B25J 9/1633 702/41 |
| 2010/0178124 A1 * | 7/2010 | Dickerson | B23C 1/12 409/141 |
| 2010/0261526 A1 * | 10/2010 | Anderson | G06F 3/017 463/31 |
| 2010/0273396 A1 * | 10/2010 | Kobayashi | B24B 37/042 451/5 |
| 2010/0305758 A1 * | 12/2010 | Nishi | G05B 19/41825 700/264 |
| 2015/0375390 A1 * | 12/2015 | Becroft | B24B 27/0007 427/427.2 |
| 2016/0090695 A1 * | 3/2016 | Heap | G05B 19/182 700/128 |
| 2017/0008171 A1 * | 1/2017 | Iwatake | B25J 9/1687 |
| 2017/0259433 A1 * | 9/2017 | Takeuchi | B25J 9/1633 |
| 2018/0050432 A1 * | 2/2018 | Morimura | B23Q 1/766 |
| 2018/0071912 A1 * | 3/2018 | Rouaud | B25J 9/0084 |
| 2018/0093360 A1 * | 4/2018 | Shinozaki | B24B 37/013 |
| 2018/0210434 A1 * | 7/2018 | Iwatake | B25J 13/085 |
| 2018/0272535 A1 * | 9/2018 | Ogawa | B25J 9/1692 |
| 2019/0105779 A1 * | 4/2019 | Einav | B25J 9/1697 |
| 2019/0193167 A1 * | 6/2019 | Horiuchi | B25J 11/005 |
| 2019/0291270 A1 * | 9/2019 | Kiyama | B25J 11/0065 |
| 2020/0001454 A1 * | 1/2020 | Iwasa | B25J 9/0081 |
| 2020/0024853 A1 * | 1/2020 | Furrer | B25J 15/0019 |
| 2020/0101603 A1 * | 4/2020 | Satou | B25J 9/1633 |
| 2020/0122325 A1 * | 4/2020 | Iwasa | B25J 9/0081 |
| 2020/0223065 A1 * | 7/2020 | Hane | G05B 13/0265 |
| 2020/0238516 A1 * | 7/2020 | Maeda | B23K 26/364 |
| 2020/0238518 A1 * | 7/2020 | Ooba | B25J 9/0084 |
| 2020/0346347 A1 * | 11/2020 | San | A61H 1/0274 |

* cited by examiner

SYSTEM AND METHOD FOR CONTROLLING THE CONTACT PRESSURE APPLIED BY AN ARTICULATED ROBOTIC ARM TO A WORKING SURFACE

RELATED APPLICATIONS

This application claims the benefit of U.S. Provisional Patent Application No. 62/729,391, filed Sep. 10, 2018.

BACKGROUND OF THE INVENTION

1. Field of the Invention

In general, the present invention relates to control systems that manage the operation of a robotic arm. More particularly, the present invention relates to control systems that control the contact pressure between the working end of a robotic arm and a working surface that acts upon an object being manipulated by the robotic arm.

2. Prior Art Description

Robots and other automated machinery are often used in industry to manufacture and assemble various components. However, no matter how precise a machine is, there is always some variation between parts. Often that variation comes in the form of burrs, flashing and/or other defects that are inherent in the manufacturing process being used.

Many manufacturers, therefore, subject parts to secondary finishing processes that are designed to remove burrs, flashing and/or other such defects. Depending upon the shape of the part, the secondary finishing processes require a part to be pressed against the working surface or a finishing machine, such as a grinding wheel, sanding belt, polishing wheel or the like. If the part is pressed against the working surface with too much force, damage can occur to the manufactured part, the finishing machine, or both. If too little force is used, not all the defects on the manufactured part are fully removed. Consequently, the process of finishing a product is a complex balance between movement and pressure. The proper balance is very difficult to program, since the size, position and severity of defects varies between parts. As a consequence, many manufacturers rely upon skilled workers to finish manufactured parts by hand. A worker holding a part has the ability to see the part and control the pressure between the part and the working surface of a finishing machine. The control is balanced to correct the defect without damaging either the part or the finishing machine.

Many manufacturers would like to have fully automated facilities that do not require workers to manually finish parts. Attempts to automate the finishing of parts often results in so many defective parts, that the use of skilled manual labor becomes a more economical choice. A need therefore exists for a system and method of automating a part finishing process that is at least as effective as employing skilled manual labor. This need is met by the present invention and is described and claimed below.

SUMMARY OF THE INVENTION

The present invention is a system and method for moving an object against a working surface of a finishing machine. The working surface of the finishing machine is set in a fixed position. The object to be contacted by the working surface is only properly improved if that object is moved in a precise movement pattern while following a precise contact pressure pattern.

In part, the object is moved against the working surface of the finishing machine using a robot with an articulating arm. Other movement is provided by a dynamic platform upon which the robot rests. The dynamic platform includes a linear slide that enables the robot to reciprocally move in a first direction. The dynamic platform also includes an active contact flange that acts upon the linear slide. The active contact flange is programmable and imparts the contact pressure pattern to the object through the linear slide and the robot.

The dynamic platform may also include a rotary table that is capable of selectively rotating the robot, the linear slide and the active contact flange relative the working surface of the finishing machine.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

The present invention system and method can be configured in many ways and can be adapted for use in many applications. However, the present invention system is especially well suited for applications where a robotic arm is being used to work a manufactured part by bringing that part into contact with a finishing machine, such as a grinding wheel or a sanding belt. Accordingly, the exemplary embodiment selected for the purposes of description and illustration shows the present invention system containing a robotic arm and two auxiliary finishing machines. The illustrated embodiment, however, is merely exemplary and should not be considered a limitation when interpreting the scope of the appended claims.

Figure 1:
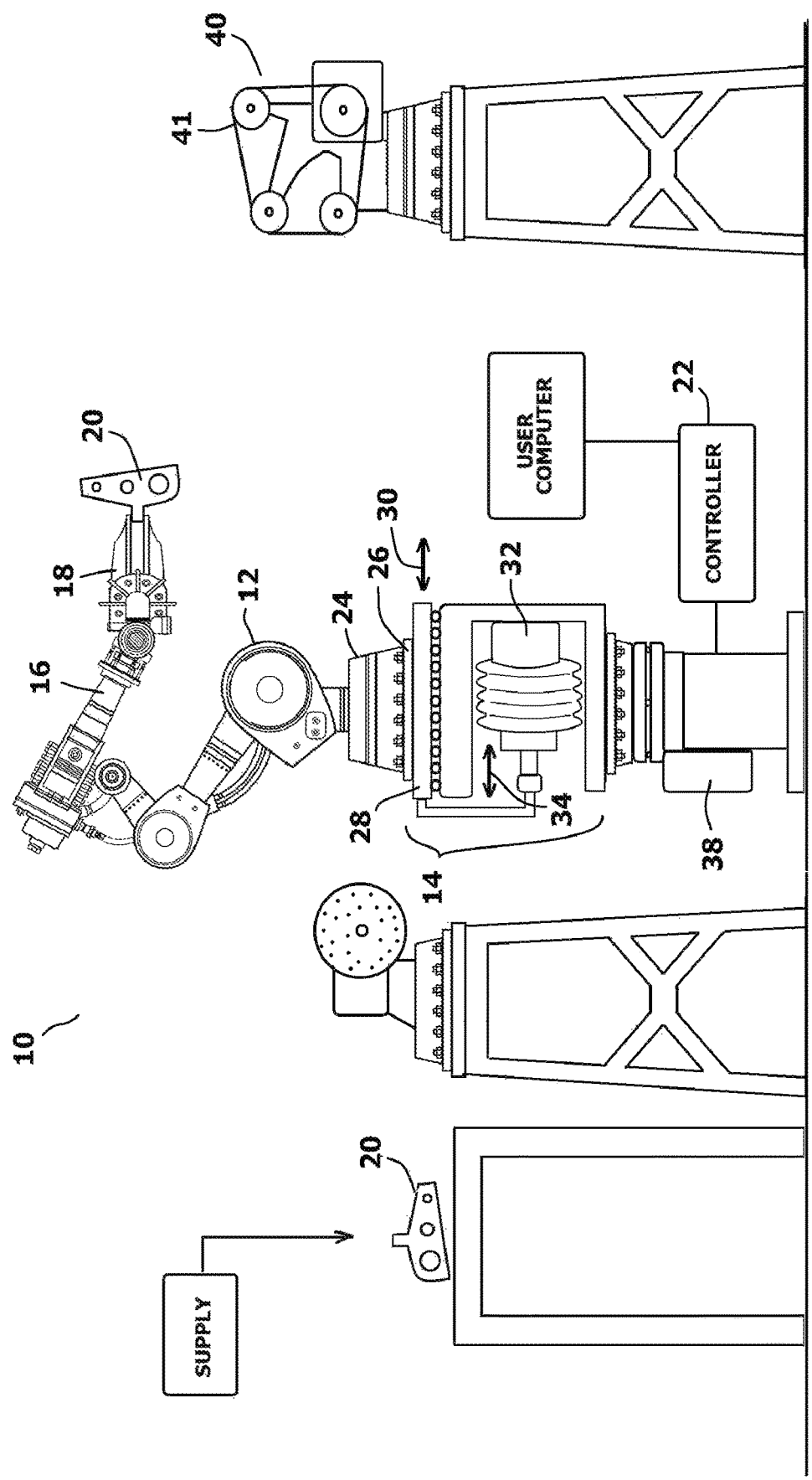
FIG. 1 shows an exemplary embodiment of the present invention system in a retracted position.
Figure 2:
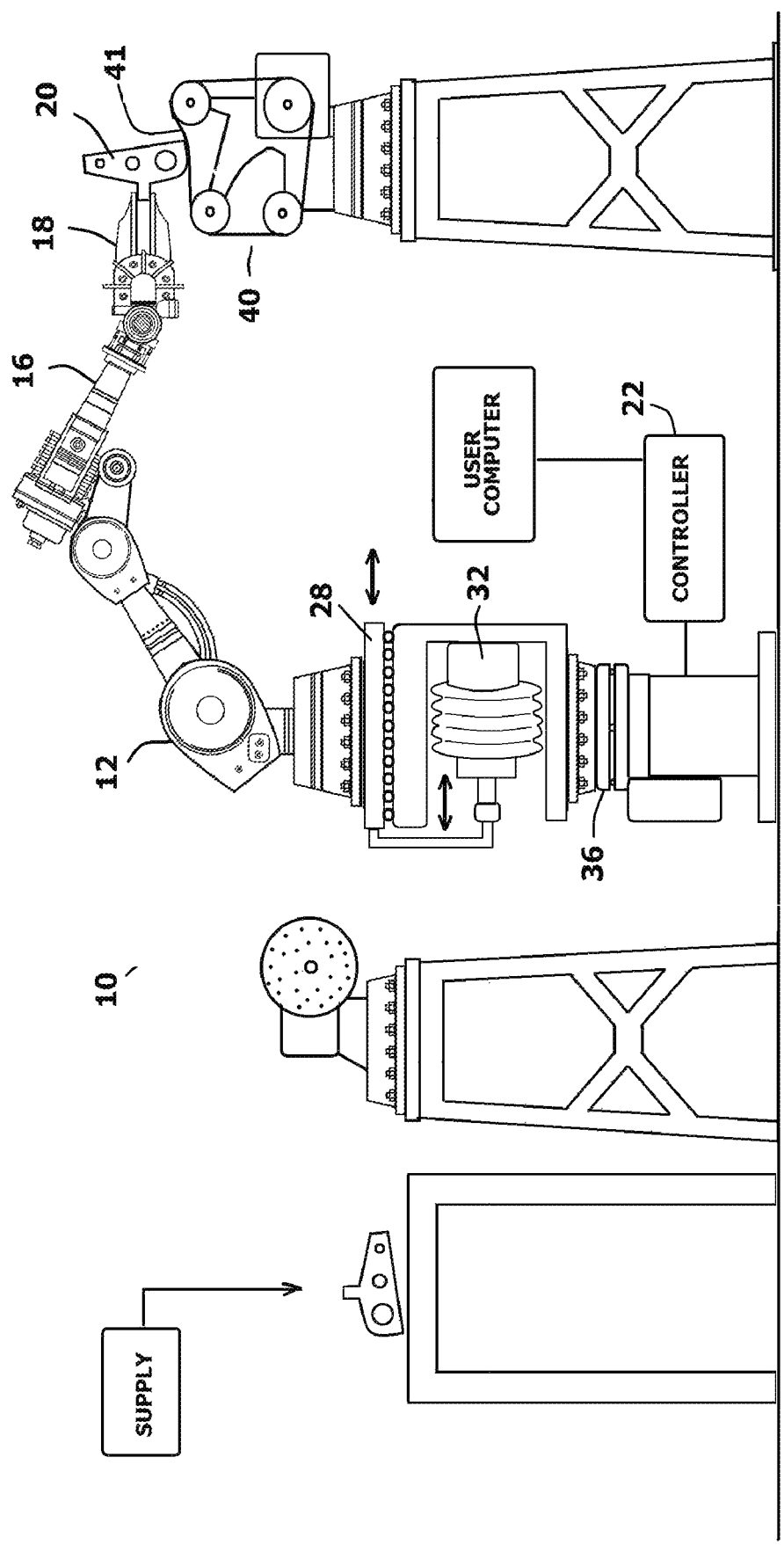
FIG. 2 shows the exemplary embodiment of the present invention system in an extended position.
Figure 3:
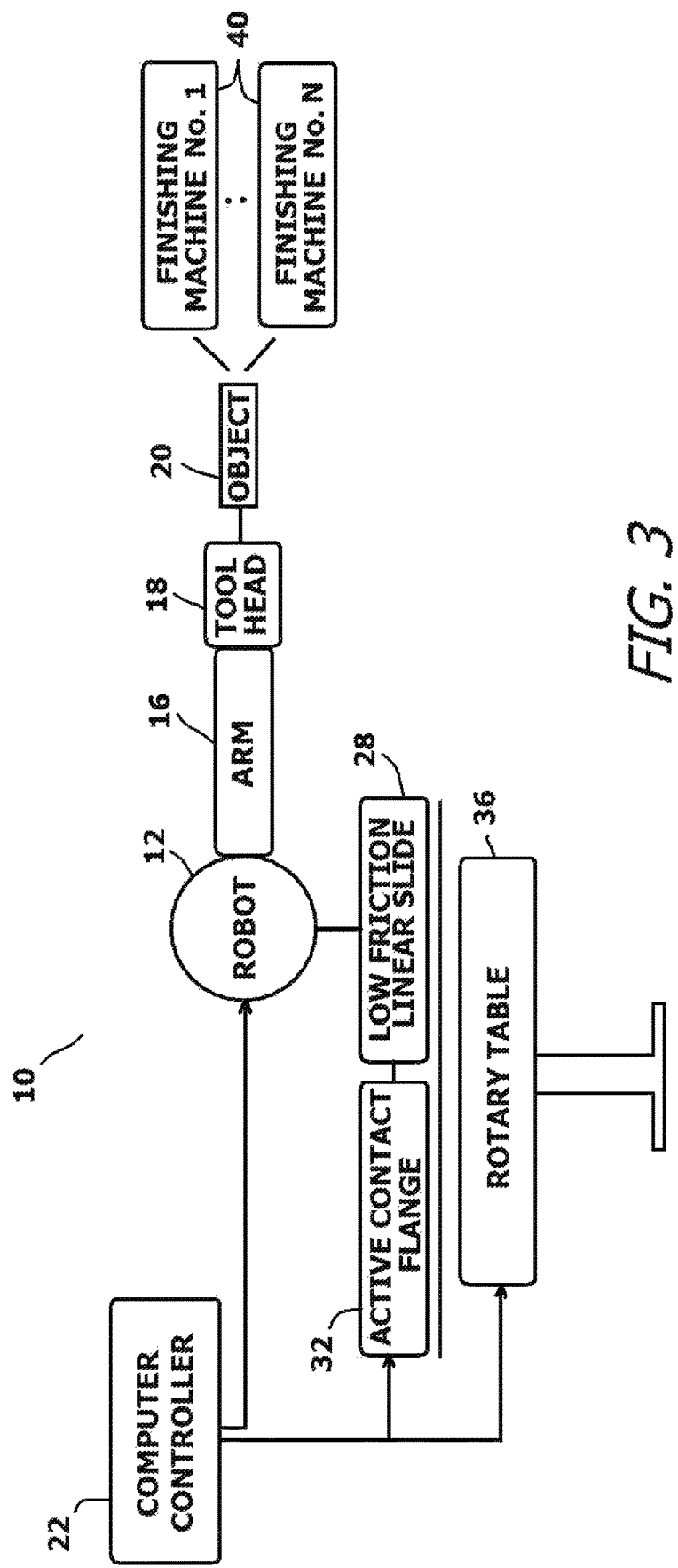
FIG. 3 shows a schematic of the exemplary embodiment.

Referring together to FIG. 1, FIG. 2, and FIG. 3, an exemplary version of the present invention system 10 is shown. An industrial robot 12 is provided. The industrial robot 12 is set atop a dynamic platform assembly 14. The industrial robot 12 has an articulating arm 16 that moves a tool head 18 in accordance with programming. In the shown embodiment, the tool head 18 is a gripper specifically designed to lift a particularly shaped object 20 for finishing. The industrial robot 12 is controlled by a programmable computer controller 22 that can be preprogrammed with complex movement patterns for the articulating arm 16. The programming sent to the industrial robot 12 is position-versus-time programming that instructs the movements of the articulating arm 16 as a function of time. During operations, the industrial robot 12 will attempt to complete its programmed movement pattern regardless of forces encountered by the articulating arm 16 while moving.

Many types of industrial robots 12 can be utilized by the present invention system 10. The industrial robot 12 can be custom-made or can be a commercial robot, such as one of the industrial robots commercially sold by the Kuka company of Augsburg, Germany.

The industrial robot 12 is programmed to lift the object 20 in need of finishing and manipulate the object 20 in accordance with its position-versus-time programming. In most prior art applications, the base of an industrial robot is set in a fixed location. This enables the industrial robot to make precise movements with respect to the reference position of its stationary base. In the present system 10, the industrial robot 12 has a base 24 that is affixed to a dynamic platform assembly 14. As will be explained, the dynamic platform assembly 14 enables the industrial robot 12 to move without any activation of the industrial robot 12, it also enables the system 10 to respond to a movement pattern of pressure-versus-time programming.

The base 24 of the industrial robot 12 is bolted to a mounting plate 26. The mounting plate 26 is set atop a low-friction linear slide 28. The low-friction linear slide 28 enables movement only in one linear direction, as is indicated by arrow 30. The low friction linear slide 28 can be a precision ball bearing slide. However, in a preferred embodiment, the low friction linear slide 28 is an air bearing slide where the mounting plate 26 moves on a cushion of air. Such air bearing slides are commercially available, as exemplified by the NewWay® air bearing slide manufactured by NewWay Machine Components Inc. of Aston, Pa. The low-friction linear slide 28 enables the mounting plate 26 and the overall industrial robot 12 to reciprocally move in the linear direction of arrow 30 in response to nearly any force provided in that linear direction.

The low-friction linear slide 28 is connected to an active contact flange 32 that governs its linear movements. The active contact flange 32 is a computer controlled device that can expand and contract in one operational direction while always providing a constant pressure in that operational direction. The operational direction of the active contact flange 32 is shown by arrow 34. An appropriate commercial active contact flange 32 is the FerRobotics® active contact flange that is manufactured by FerRobotics Compliant Robot Technology GmbH of Osterrich, Germany. The operational direction, arrow 34, of the active contact flange is aligned with the linear direction, arrow 30, of the low friction linear slide 28. In this manner, the active contact flange 32 can control the force needed to move the low friction linear slide 28.

Both the low-friction linear slide 28 and the active contact flange 32 are set atop a crossed roller rotary table 36. The crossed roller rotary table 36 uses a computer controlled stepper motor 38 to control rotation in the horizontal plane around a vertical axis. By positioning the low-friction linear slide 28 and the active contact flange 32 atop the crossed roller rotary table 36, it will be understood that both the operational direction, arrow 34, of the active contact flange 32 and the aligned linear direction, arrow 32, of the low friction linear slide 28 can be selectively oriented within a full 360 degree range.

The industrial robot 12, the active contact flange 32 and the crossed roller rotary table 36 are all operated by the programmable computer controller 34. The industrial robot 12 and the crossed roller rotary table 36 execute position-versus-time programming to produce a complex movement pattern. The active contact flange 32 executes pressure-versus-time programming to produce a complex contact pressure pattern. Both programs are time dependent and contain time data. The time data used by the programming of the industrial robot 12 and the crossed roller rotary table 36 is synchronized with the time data used by the programming of the active contact flange 32.

One or more finishing machines 40 are set within the reach of the industrial robot 12. The finishing machines 40 are set in fixed positions so that the positions of the finishing machines 40 do not vary with time. The finishing machines 40 have working surfaces 41 capable of finishing some element of the object 20 being manipulated by the industrial robot 12. For example, the finishing machines 40 can be a grinding machine and a belt sander for removing burrs from the object 20. Alternatively, the finishing machines 40 can be polishing wheels to buff the object 20. In the shown embodiment, two finishing machines 40 are shown. The finishing machines 40 are shown on opposite sides of the industrial robot 12 for illustration purposes only. It will be understood that the finishing machines 40 will be positioned near each other for practical purposes. This will minimize the time required for the industrial robot 12 to move the object 20 between the finishing machines 40.

The working surface 41 of each finishing machine 40 creates some force that acts upon the object 20 being finished. The crossed roller rotary table 36 rotates the industrial robot 12 into an orientation so that when the finishing machine 40 acts upon the object 20, the force is capable of being counteracted by the active contact flange 32. The counteracting force provided by the active contact flange 32 is dependent upon a pressure-versus-time program being executed by the programmable computer controller 22. The pressure-versus-time program is synchronized with the position-versus-time programming of the industrial robot 12. For example, during the operating cycle of the industrial robot 12 running its position-versus-time programming, the optimal contact forces between the object 20 and one of the finishing machines 40 may be one Newton. Accordingly, at this exact moment in time, the pressure-versus-time programming of the active contact flange 32 would be set to a counteracting force of one Newton. As such, a force must be provided by the active contact flange 32 in its operational direction of one Newton. If the force at that moment in time exceeds one Newton, the active contact flange 32 will yield away from the excessive force in order to diminish the force. When the active contact flange 32 yields, it moves the low-friction linear slide 28. The movement of the low friction linear slide 28, in turn, moves the industrial robot 12, therein causing the object 20 being held against one of the finishing machines 40 to engage the finishing machine 40 with less force. Likewise, if the force is less than the programmed one Newton, the active contact flange 32 will expand in order to increase that force. When the active contact flange 32 expands, it moves the low-friction linear slide 28. The movement of the low friction linear slide 28, in turn, moves the industrial robot 12, therein causing the object 20 being held against one of the finishing machines 40 to engage that finishing machine 40 with increased force. As a result, the programmed force at which a finishing machine engages an object is dynamically maintained.

Figure 4:
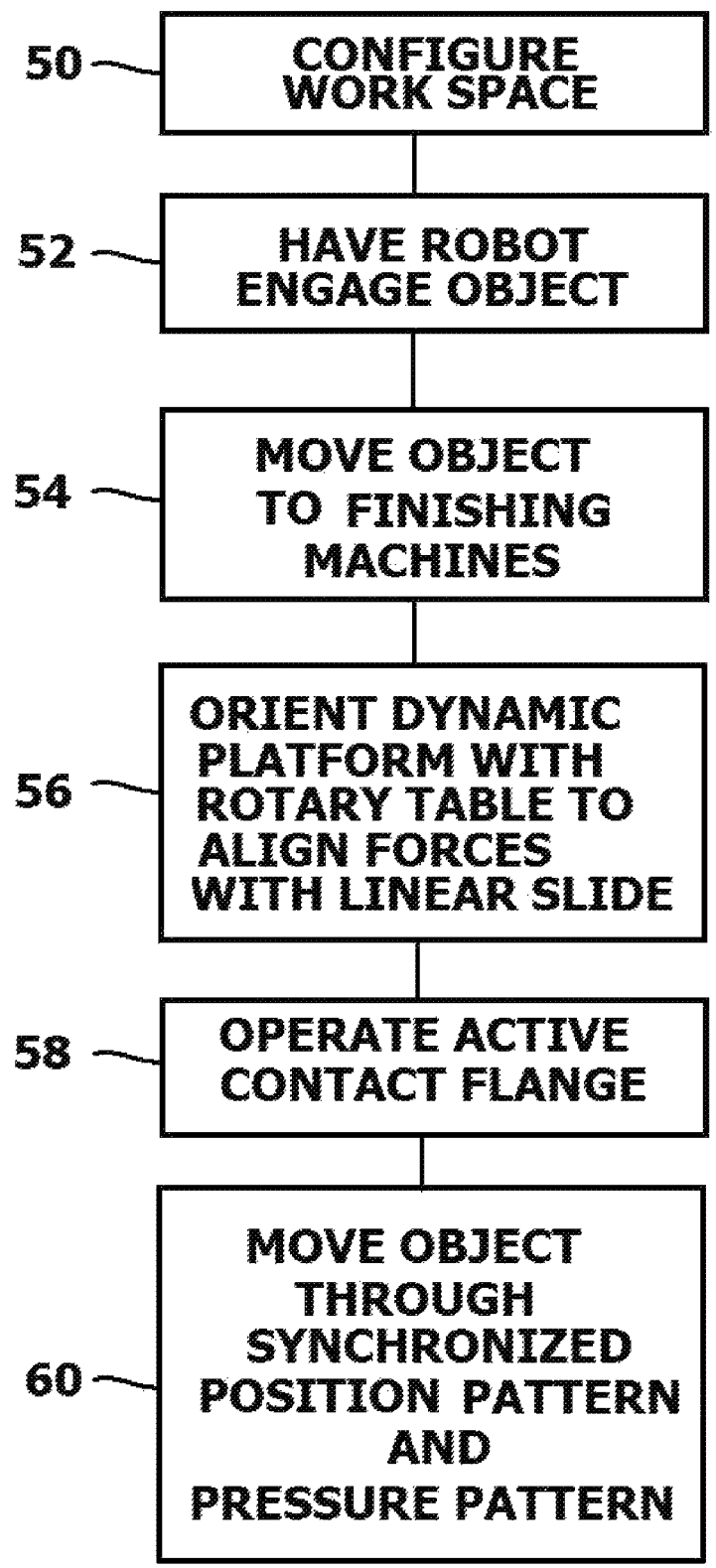
FIG. 4 shows a block diagram logic flow for a method of operation.

Referring to FIG. 4 in conjunction with FIG. 3, it will be understood that a workspace is configured by mounting the industrial robot 12 upon the dynamic platform assembly 14 and positioning the work surfaces 41 of the finishing machines 40 in reach of the industrial robot. See Block 50. In operation, the industrial robot 12 is programmed with a position-versus-time motion program to pick up an object 20 from a supply position. See Block 52. The industrial robot 12 then moves various surfaces of the object 20 into contact with various finishing machines 40. See Block 54. In addition to the position-versus-time movement of the industrial robot 12, the crossed roller rotary table 32 is also executes position-versus-time movement. See Block 56. The movement of the industrial robot 12 and the crossed roller rotary table 36 is designed to both bring the object 20 in contact with the finishing machines 40 and to direct the forces applied by the finishing machines 40 into a vector that aligns with the direction of linear movement embodied by the low-friction linear slide 28. The movement of the low friction slide 28 is controlled by the active contact flange 32. The position-versus-time programming for the industrial robot 12 and the crossed roller rotary table 36 is supplemented by the pressure-versus-time programming of the active contact flange 32. The active contact flange 32 is activated to provide varying forces in accordance with the required contact force pattern. See Block 58. Should the pressure between the object and one of the finishing machines exceed a programmed maximum within a referenced time frame, the mounting platform 14 holding the industrial robot 12 will move to reduce the pressure to within the programmed specifications. The object 20 is manipulated through the preprogrammed position pattern and pressure pattern. See Block 60. By controlling the contact between the object 20 and the finishing machines 40 as a function of position and pressure in synchronized time, the automated system 10 can better simulate the movements of a skilled worker's hands. The automated system can therefore better match the results of a human worker who is manually finishing an object using the finishing machines 40.

It will be understood that the embodiment of the present invention that is illustrated and described is merely exemplary and that a person skilled in the art can make many variations to that embodiment. All such embodiments are intended to be included within the scope of the present invention as defined by the appended claims.

What is claimed is:

1. A system for moving an object against a working surface, said system comprising:
    a machine having a working surface;
    an object that is improved by being moved in contact with said working surface following a movement pattern and a contact pressure pattern;
    a robot that moves said object into contact with said working surface, wherein said robot moves said object through a first portion of said movement pattern; and
    a dynamic platform that supports said robot, wherein said dynamic platform moves said robot to impart said contact pressure pattern through said robot as said robot moves said object.

2. The system according to claim 1, wherein said dynamic platform includes a linear slide that enables said robot to reciprocally move in a first direction.

3. The system according to claim 2, wherein said dynamic platform includes an active contact flange that moves said robot on said linear slide, wherein said active contact flange imparts said contact pressure pattern to said object through said linear slide and said robot.

4. The system according to claim 2, wherein said dynamic platform includes a rotary table capable of selectively rotating said linear slide and said robot.

5. The system according to claim 4, wherein said robot imparts said first portion of said movement pattern and said rotary table imparts a second portion of said movement pattern.

6. The system according to claim 1, wherein said robot includes an articulating arm with a tool head that grips said object and carries said object into contact with said working surface.

7. The system according to claim 4, wherein said robot and said rotary table have a common computer controller.

8. A system for moving an object against a working surface, said system comprising:
    a machine having a working surface;
    an object that is worked by being moved against said working surface following a movement pattern and a contact pressure pattern;
    a robot that selectively moves said object into contact with said working surface;
    a linear slide that supports said robot, wherein said linear slide enables said robot to reciprocally move in a first direction;
    an active contact flange coupled to said linear slide that provides a constant force to said linear slide in said first direction; and
    a computer controller for operating said robot and said active contact flange, wherein said computer controller operates said robot and said active contact flange to move said object through said movement pattern while imparting said contact pressure pattern.

9. The system according to claim 8, further including a rotary table that supports said robot, said linear slide and said active contact flange, wherein said rotary table is selectively controlled by said computer controller and can selectively alter said first direction relative said working surface.

10. The system according to claim 9, wherein said robot and said rotary table combine to impart said movement pattern to said object.

11. The system according to claim 8, wherein said robot includes an articulating arm with a tool head that grips said object and carries said object into contact with said working surface.

12. The system according to claim 8, wherein said working surface is in a fixed position and said linear slide moves said robot in said first direction relative said fixed position.

13. A method of working an object by moving said object against a working surface, said system comprising:
    providing a machine having said working surface;
    providing a robot that is capable of engaging said object and moving said object against said working surface following a movement pattern and a contact pressure pattern;
    positioning said robot on a dynamic platform that moves said robot relative said working surface, wherein said robot and said dynamic platform work in unison to impart said movement pattern and said contact pressure pattern.

14. The method according to claim 13, wherein said dynamic platform includes a linear slide that enables said robot to reciprocally move in a first direction.

15. The method according to claim 14, wherein said dynamic platform further includes an active contact flange that moves said robot on said linear slide, wherein said active contact flange imparts said contact pressure pattern to said object through said linear slide and said robot.

16. The method according to claim 13, wherein said dynamic platform further includes a rotary table capable of selectively rotating said linear slide and said robot.

17. The method according to claim 13, wherein providing said robot includes providing a robot with an articulating arm and a tool head that grips said object and carries said object into contact with said working surface.

18. The method according to claim 13, further including providing a common computer controller for selectively controlling said robot and said dynamic platform.

\* \* \* \* \*